United States Patent [19]

Jacobellis

[11] Patent Number: 4,970,089

[45] Date of Patent: Nov. 13, 1990

[54] METHOD FOR MAKING DRIED POWDERED FRUIT OR VEGETABLE SALAD

[76] Inventor: Maria Jacobellis, Foot of Berger, Amityville, N.Y. 11701

[21] Appl. No.: 414,398

[22] Filed: Sep. 29, 1989

[51] Int. Cl.⁵ .............................................. A23B 7/024
[52] U.S. Cl. .................................... 426/640; 426/384; 426/443
[58] Field of Search ............... 426/615, 443, 384, 325, 426/640, 444

[56] References Cited

U.S. PATENT DOCUMENTS

| | | |
|---|---|---|
| 101,562 | 4/1870 | Alden . |
| 3,025,171 | 3/1962 | Schroeder ........................... 426/443 |
| 3,264,121 | 8/1966 | Tuomy ................................ 426/640 |
| 3,309,207 | 3/1967 | Tuomy ................................ 426/615 |
| 3,385,715 | 5/1968 | Ishler et al. . |
| 3,445,247 | 5/1969 | Baerwald ........................... 426/385 |
| 3,501,319 | 3/1970 | Ewalt ................................. 426/385 |
| 3,511,668 | 5/1970 | Vollink .............................. 426/385 |
| 3,594,194 | 7/1971 | Ricci ................................. 426/384 |
| 3,765,904 | 10/1973 | de Roissart ........................ 426/384 |
| 3,775,133 | 11/1973 | Batley, Jr. . |
| 3,787,591 | 1/1974 | Hagiwara ........................... 426/640 |
| 3,787,595 | 1/1974 | Folzenlogen ....................... 426/384 |
| 3,806,610 | 4/1974 | Rahman . |
| 3,821,435 | 6/1974 | Blake ................................. 426/615 |
| 3,950,560 | 4/1976 | Rahman ............................. 426/385 |
| 4,401,682 | 8/1983 | Battista . |
| 4,707,370 | 11/1987 | Kakis ................................. 426/443 |
| 4,832,969 | 5/1989 | Lioutas .............................. 426/615 |
| 4,877,627 | 10/1989 | Leitz ................................. 426/615 |

FOREIGN PATENT DOCUMENTS

| | | | |
|---|---|---|---|
| 313992 | 7/1956 | France .............................. 426/385 |
| 466390 | 9/1967 | Japan ................................ 426/385 |
| 946330 | 1/1964 | United Kingdom ............... 426/443 |

*Primary Examiner*—Carolyn Paden
*Attorney, Agent, or Firm*—Leonard Belkin

[57] ABSTRACT

A method for making a fruit and a vegetable salad is disclosed which consists of masticated produce which is freeze dried to produce a powder. Each of the fruit/vegetable salads contains the fruit or vegetable powders mixed in equal proportion by weight.

11 Claims, No Drawings

METHOD FOR MAKING DRIED POWDERED FRUIT OR VEGETABLE SALAD

BACKGROUND OF THE INVENTION

This invention relates to an approved food product having the proper balance of nutrients including vitamins and minerals, fibers, and improved digestibility.

Based on a U.S. Department of Agriculture survey, Americans on average, eat foods that supply only 25-30% of the beta carotene in diets suggested to help reduce risk of certain types of cancer. See "Dietary Intake of Carotenes Gap," in "Clinical Nutrition," May-June 1988. Ever since an association was found between diets high in beta carotene-rich foods and lowered risk of certain cancers, there has been increased interest in foods which are rich in beta carotene.

Diets recommended by leading government agencies include fruits and vegetables rich in beta carotene. Analysis of these diets shows that anyone following them would be eating 5 to 6 mg of beta carotene each day.

But ideal diets and actual diets are often far apart. In fact, on average, Americans are only getting about 1.5 mg of beta carotene a day based on the widely accepted U.S. Department of Agriculture Food Intake Survey. And that is only about 25-30% of the beta carotene found in the recommended diets—a very substantial gap. This beta carotene gap can be closed by spinach, kale, swiss chard, carrots, pumpkins, sweet potatoes, apricots, peaches, payayas and cantaloupes. These foods also provide fiber and other important nutrients. New scientific findings are confirming that synthetic, isolated vitamins, minerals, and other nutrients do not necessarily deliver full effectiveness.

The body utilizes the minerals and vitamins composing such food. It has been proved beyond a doubt that supplementing meals with raw vegetables and raw fruits is the quickest and most permanent way to replenish the body with the elements it lacks.

Research by world renowned scientists proves that organically grown minerals and vitamins are many times better absorbed and more effective than any "natural" supplement. For example, "natural" calcium carbonate and oyster shell calcium pass right through the body without being absorbed. This type of "natural" calcium therefore cannot provide the health benefits expected and paid for.

Good organic produce has very beneficial tough cell wall structures.

The average American consumer believes pesticide residue to be the major food safety issue.

They are rightly fearful. There is without a doubt a dangerous risk factor with carcinogenic isolated chemicals used on our produce. Chemicals have been demonstrated by government studies to be potent carcinogens in laboratory tests.

The human body is enextricably dependent on the quality of the foods eaten, and no less in their compatibility with the needs of the body.

The following U.S. Patents show a variety of foods and methods of preparing such foods: U.S. Pat. Nos. 101,562; 3,385,715; 3,775,133; 3,806,610; 3,950,560; and 4,401,682.

None of the preceding patents discloses the specific salads and the making of said salads described and claimed in this application.

SUMMARY OF THE INVENTION

In the present invention there are provided a variety of prepared fresh vegetable and fruit salads containing the proper balance of ingredients required for a healthy and adequate diet.

In order to improve digestibility in these salads the cell walls are broken down with the least amount of processing possible for the ultimate in complete organic wholefood salad multivitamin. The use of heat, chemicals, enzymes, or even ultrasound are avoided.

In this invention, balanced vegetable and fruit powders are provided that energize instantly in water. A potent blend of organic protein, vitamins, minerals, and enzymes that give more balanced nutrition than any other produce. Gram for gram salads made according to the principles of this invention contain five times the soluble fiber of oat bran. A person would have to eat nearly three oat bran muffins or two bowls of oat meal to get all the soluble fiber in one gram of my salad. A gram of my salad in powdered form mixed in a glass of water has only five calories per serving. It produces organic juices instantly, and anywhere.

DESCRIPTION OF THE PREFERRED EMBODIMENTS

In this invention, there is prepared a salad in powdered form of raw, that is, uncooked, organically grown vegetable or fruit ingredients.

The ingredients are each masticated and freeze dried to a powder. The powdered ingredients are then mixed in approximately equal amounts.

The following are examples of vegetable salads:
A. alfalfa, carrot and lettuce.
B. carrot, celery and lettuce.
C. beet, carrot and cucumber.
D. brussel sprout, carrot, lettuce and string bean.

The following are examples of fruit salads:
E. banana, date and grape.
F. cantaloupe, honey dew, and watermelon.
G. grapefruit, lemon and orange.

Tables A and B list the nutritional makeup of each of the above described salads.

TABLE A

VEGETABLE SALADS
Figures based on one pound per Salad Component

| Ingred. | H₂O gms. | Prot. gms. | Carb. gms. | Fat gms. | Vit. A units | Vit. C units | Thia mg. | Ribo mg. | Niac gms. | Ca gms. | Mg gms. |
|---|---|---|---|---|---|---|---|---|---|---|---|
| Alfalfa | 393 | 14 | 45 | .03 | 199760 | 799 | 22.7 | 187 | .49 | 7.95 | 1.5 |
| Carrots | 395 | 5 | 44 | .92 | 6000 | 70 | .4 | .3 | 3.15 | .48 | .18 |
| Lettuce | 432 | 6.3 | 11.2 | 1.25 | 5000 | 76 | .4 | .4 | 1.72 | .70 | .30 |
| Comp-Total | 1220 | 25.3 | 100.2 | 2.20 | 210760 | 945 | 23.5 | 187.7 | 5.36 | 9.13 | 1.98 |
| Carrot | 395 | 5 | 44 | .92 | 6000 | 70 | .36 | .29 | 3.15 | .48 | .18 |
| Celery | 429 | 4.9 | 16.8 | .45 | 1600 | 62 | .18 | .19 | 1.65 | .64 | .22 |

TABLE A-continued
VEGETABLE SALADS
Figures based on one pound per Salad Component

| | | | | | | | | | | | |
|---|---|---|---|---|---|---|---|---|---|---|---|
| Lettuce | 432 | 6.3 | 11.2 | 1.25 | 5000 | 76 | .38 | .36 | 1.72 | .70 | .30 |
| Comp-Total | 1256 | 16.2 | 72.0 | 2.62 | 12600 | 208 | .92 | .84 | 6.52 | 1.82 | .70 |
| Beet | 399 | 7.2 | 64.5 | 1.12 | 200 | 62 | .18 | .37 | 2.30 | .32 | .18 |
| Carrot | 395 | 5 | 44 | .92 | 6000 | 70 | .36 | .29 | 3.15 | .48 | .18 |
| Cucumber | 435 | 5.4 | 13 | .45 | 1400 | 68 | .17 | .25 | 1.12 | .15 | .08 |
| Comp-Total | 1229 | 17.6 | 121.5 | 2.49 | 7600 | 200 | .71 | .91 | 6.57 | .95 | .44 |
| B. Sprout | 388 | 27.5 | 36 | 1.40 | 3000 | 525 | .63 | .97 | 5 | .13 | .13 |
| Carrot | 395 | 5 | 44 | .92 | 6000 | 70 | .36 | .29 | 3.15 | .48 | .18 |
| Lettuce | 432 | 6.3 | 11 | 1.25 | 5000 | 76 | .38 | .36 | 1.72 | .70 | .30 |
| St. Bean | 400 | 16 | 32 | .90 | 3000 | 100 | .38 | .50 | 2.40 | .54 | .45 |
| Comp-Total | 1615 | 54.8 | 123 | 4.47 | 17000 | 771 | 1.75 | 2.12 | 12.27 | 1.85 | 1.06 |

| Ingred. | K gms. | P gms. | S gms. | Fe gms. | Si gms. | Cl gms. | Na gms. | O gms. | H gms. | N gms. |
|---|---|---|---|---|---|---|---|---|---|---|
| Alfalfa | 9.1 | 1.14 | 1.32 | 1.59 | .001 | 1.27 | .68 | 131 | 262 | 2.5 |
| Carrots | 1.56 | .54 | .27 | .04 | .10 | .20 | .91 | 131 | 262 | .9 |
| Lettuce | 1.80 | .45 | .18 | .25 | .39 | .37 | .36 | 144 | 288 | 1.1 |
| Comp-Total | 12.46 | 2.13 | 1.77 | 1.88 | .491 | 1.84 | 1.95 | 406 | 812 | 4.5 |
| Carrot | 1.56 | .54 | .27 | .04 | .10 | .20 | .91 | 131 | 262 | .85 |
| Celery | 1.54 | .47 | .21 | .05 | .14 | .57 | 2.10 | 143 | 286 | .90 |
| Lettuce | 1.80 | .45 | .18 | .25 | .39 | .37 | .36 | 144 | 288 | 1.05 |
| Comp-Total | 4.9 | 1.46 | .66 | .34 | .63 | 1.14 | 3.37 | 418 | 836 | 2.8 |
| Beet | 1.94 | .62 | .32 | .05 | .40 | .46 | .46 | 133 | 266 | 1.22 |
| Carrot | 1.56 | .54 | .27 | .04 | .10 | .20 | .91 | 131 | 262 | .85 |
| Cucumber | .80 | .40 | .14 | .03 | .16 | .13 | .20 | 145 | 290 | 1 |
| Comp-Total | 4.30 | 1.56 | .73 | .12 | .66 | .79 | 1.57 | 409 | 818 | 3.07 |
| B. Sprout | 1.70 | 1.10 | 1.93 | .03 | .01 | .15 | .02 | 129 | 259 | 3.60 |
| Carrot | 1.56 | .54 | .27 | .04 | .10 | .20 | .91 | 131 | 262 | .85 |
| Lettuce | 1.80 | .45 | .18 | .25 | .39 | .37 | .36 | 144 | 288 | 1.05 |
| St. Bean | 2.30 | .47 | .92 | .01 | .01 | .51 | .13 | 133 | 266 | 1.68 |
| Comp-Total | 7.36 | 2.56 | 3.30 | .33 | .51 | 1.23 | 1.42 | 537 | 1075 | 7.18 |

TABLE B
FRUIT SALADS

| Ingred. | H₂O | Prot. | Carb. | Fat | Vit. A | Vit. C | Thia | Ribo | Niac | Ca | Mg | K |
|---|---|---|---|---|---|---|---|---|---|---|---|---|
| Banana | 342 | 5.85 | 103 | 2 | 1000 | 60 | .23 | .29 | .30 | .08 | .27 | 1.80 |
| Date | 100 | 9.75 | 325 | 5 | 500 | 0 | .50 | .60 | 12 | .42 | .43 | 3.80 |
| Grape | 387 | 5.90 | 56 | 4.5 | 850 | 48 | .26 | .20 | 1.65 | .28 | .13 | 1.80 |
| Comp-Total | 829 | 21.5 | 484 | 11.5 | 2350 | 108 | .99 | 1.09 | 13.95 | .78 | .83 | 7.40 |
| Cant. | 408 | 3.60 | 38 | .50 | 15000 | 183 | .24 | .18 | 3.18 | .12 | .12 | 1.30 |
| HoneyDew | 414 | 2.30 | 22 | .90 | 120 | 69 | .13 | .09 | 1.80 | .040 | .036 | .00717 |
| WaterMel | 420 | 2.30 | 30 | .90 | 3500 | 90 | .18 | 1.28 | 1.28 | .15 | .08 | .65 |
| Comp-Total | 1242 | 8.2 | 90 | 2.3 | 18620 | 342 | .55 | 2.64 | 6.26 | .31 | .236 | 1.95717 |
| GrapeFrt | 399 | 2.55 | 45 | .25 | 600 | 1325 | .25 | .18 | 1.20 | .13 | .07 | .75 |
| Lemon | 408 | 3.30 | 24.9 | .90 | 50 | 161 | .13 | .06 | .40 | .079 | .0001 | .42 |
| Orange | 395 | 6.84 | 37 | .90 | 1.50 | 275 | .62 | .32 | 2.18 | .55 | .13 | 1.15 |
| Comp-Total | 1202 | 12.69 | 106.9 | 2.05 | 651.5 | 1761 | 1 | .56 | 3.78 | .759 | .2001 | 2.32 |

| Ingred. | P | S | Fe | Si | Cl | Na | O | H | N |
|---|---|---|---|---|---|---|---|---|---|
| Banana | .32 | .13 | .01 | .09 | .33 | .63 | 114 | 228 | 1 |
| Date | .36 | .45 | .05 | .01 | 1.41 | .36 | 33.34 | 66.66 | 1.60 |
| Grape | .40 | .15 | .05 | .06 | .04 | .04 | 129 | 258 | .98 |
| Comp-Total | 1.08 | .73 | .11 | .16 | 1.78 | 1.03 | 276.34 | 552.66 | 3.58 |
| Cant. | .16 | .10 | .02 | .40 | .14 | .10 | 136 | 272 | .60 |
| HoneyDew | .046 | .005 | .0011 | .0003 | .00025 | .034 | 136 | 272 | .40 |
| WaterMel | .20 | .10 | .06 | .05 | .04 | .14 | 140 | 280 | .40 |
| Comp-Total | .406 | .205 | .0811 | .4503 | .18025 | .274 | 412 | 824 | 1.4 |
| GrapeFrt | .19 | .06 | .02 | .01 | .03 | .02 | 133 | 266 | .42 |
| Lemon | .05 | .06 | .002 | .02 | .01 | .006 | 136 | 272 | .85 |
| Orange | .30 | .13 | .03 | .02 | .03 | .06 | 132 | 263 | 1.15 |
| Comp- | .54 | .25 | .052 | .05 | .07 | .086 | 401 | 801 | 2.42 |

| TABLE B-continued |
|---|
| FRUIT SALADS |
| Total |

Prior to this invention, the person searching for complete nourishment had to resort to first locating adequate supply of quality organic produce, then for ease on the digestive organs purchase an expensive juicer and juice their bounty, most of the time a very time consuming process. The person on the go would in all likelihood occasionally neglect his health with "fast-food". This invention provides all of the required nourishment with all of the advantages of fast food.

A salad made according to the principles of this invention is easily assimilatable and complete with multivitamins. The salad can be taken in its dry powdered form for a quick energy boost first thing in the morning, or it can be added to oatmeal, fruit or vegetable salad, yogurt, gelatin/pectin, pudding, ice cream, main course, side course, dessert, snack, treat, mineral water, sparkling water, milk, soup, casseroles, applesauce, mashed potatoes.

The salad could satisfy pediatric and geriatric requirements. For example there is a large constipation problem in the geriatric population in this country. Brewed with warm mineral water, a packet of the present salad will provide essential enzymes with the least amount of effort from their frail digestive systems. For these individuals, too much time and energy, actually hours, goes into digesting these perfect organic wholefoods. A portion of their food eaten is thus diverted from its nutritional goal to be used as fuel to generate energy. With this invention this is no longer the case.

The salads described above are rich in fibers which contain no nourishment. However, the fibers serve a very useful and much needed purpose. Fibers act as an intestinal broom. Even though such fibers reach the colon in microscopic cellulose particles after traveling through the stomach, the duodenum and finally the 25 feet of small intestine, the colon still considers such fiber particles as roughage and uses them as such. Without fibers as roughage the colon and the body as a whole cannot be maintained in a healthy condition. It is thus imperative that a well balanced diet throughout 24 hours each day of life should contain as the main course, a salad composed of a variety of raw vegetables and/or raw fruits.

These salads are rich in vitamin and enzymes. Basically speaking it is easy to decide against taking an isolated chemical. An isolated chemical extracted from some source, a wholefood or not and its potential is dangerous. If a doctor tells a patient that he needs vitamin C, he should look for vitamin C with all the chemicals surrounding to balance the body instead of setting up for side effects in the really not so distant future. The FDA looks at an orange and will definitely admit its vitamin C is much more powerful and substantial for the mere fact that there are all the other chemicals also in the orange that balance it that they cannot not even identify. Hence, the orange should be eaten for its vitamin C. If in a hurry and there is no time to sit and eat an orange, one of the above salads will fill that requirement.

If enzymes are missing, that is, if a person is not receiving his daily dose of raw produce, one of these salads will meet that requirement. Enzymes have been described as complex substances which enable us to digest food and to absorb it into our blood. Enzymes are sensitive to temperatures above 118 degrees F. About 120 degrees F. enzymes become sluggish, just as the human body becomes languid and relaxed in a hot bath. At 130 degrees F. the life of enzymes is extinct. They are dead. Salads made according to this invention provide those enzymes.

In order to regain and maintain the proper balance of health, most of the food we eat must contain live, vital, organic elements. These elements are found in fresh raw vegetable, fruits, nuts and seeds.

Oxygen is one of the most essential elements. As soon as food is cooked, its oxygen is lost.

Why not eat the whole vegetable and fruit instead of in a freeze dried state? Solid food in its whole state requires many hours of digestive activity before its nourishment is finally available to the cells and tissues of the body. In the freeze dried state, this enables my salad to be very quickly digested and assimilated, sometimes in a matter of minutes, with a minimum of effort and exertion on the part of the digestive system. Whole vegetable and fruits are composed of a considerable quantity of fibers. Within the interstices of these fibers are enclosed the atoms and molecules with the essential nutritional elements we need. It is these atoms and molecules and their respective enzymes in the fresh freeze-dried state which aids the speedy nourishment of the cells and tissues, glands, organs and every part of our body. Complete wholefood multi-vitamin, without any synthetic, artificial, or side-effect causing.

When food is heated it leads to the devaluation of enzymes in food. Of all the many thousands of species of creatures on Earth, only humans and their domesticated counterparts, housepets, attempt to live without food enzymes. The easily digestible, easily assimilateable, easily energizing organic wholefood, salad of this invention complete multi-vitamins avoid heating of the enzymes.

The key to health is as much raw salad for maintaining health. Not only are the individuals internal metabolic enzymes preserved on a predominantly raw diet, but the need for digestive enzymes is also reduced. By giving the metabolic enzymes a vacation from their second job (digestion) they can be made more effective in their real job—repairing, cleansing, and building the body. No other vitamin can guarantee these health benefits. This scientific breakthrough of my invention puts us ten years ahead of all "natural" vitamin manufacturers who rely on laboratory processes to refine and manufacture—not grow their supplements.

Most vitamins even when formulated correctly, present obstacles to absorption. That is because they contain binders and coatings to prevent them from coming apart in the bottle. The trouble is that what keeps them from coming apart in the bottle, makes them more difficult to dissolve in the body. In fact it is entirely possible that most vitamins ingested are passing through, completely intact. The salad of this invention has no binders, no fillers, no coatings, thus it can be absorbed quickly and easily. Equally important, it provides the essential vitamins and minerals that all of us need.

My salad hereinafter referred to as insta-salads, are more concentrated in soluble fiber. Gram for gram an insta-salad contains five times the soluble fiber of oat bran. So a person would have to eat on average nearly three oat bran muffins or two bowls of oat meal to get all the soluble fiber in one gram of insta-salad. And a gram of insta-salad mixed in a glass of water has only 5 calories per serving, producing organic juice instantly, anywhere. Medical researchers are finding out more good news about soluble fiber every day.

Because produce is a whole food plant, it contains every complex chemical necessary for the "protoplasm of life" The entire cells of the produce is used, containing all the nutrients necessary to sustain life. It is a wholefood, not subjected to any refining process. And it has not been exposed to any chemical pesticides, preservatives, artificial coloring, flavoring, or additives. In general, produce is a wonderful storehouse of nutrients for athletes and vegetarians. Its immune-enhancing capabilities enable it to activate PMNs and rebuild the body's defense system. As a result, it can be of real value in preventing opportunistic infections following from chronic diseases or from organ transplatations, as Japanese researchers have found.

Produce is also probably the most potent both for neutralizing acidity in the system and for building up the immune system. So many people today have built up a great deal of acidity in their bodies through eating too much meat and sweets, cakes and junk foods. That acidity will set up a wide variety of symptoms. Taking of a produce such as insta-salad could help to ameliorate some of these conditions.

By organically grown produce and similar language used herein is meant produce which is grown and delivered with nothing unnatural or artificial being added or applied, to alter the produce, product, or its longevity.

While only certain preferred embodiments of this invention have been described it is understood that many variations are possible without departing from the principals of this invention as defined in the claims which follow.

What is claimed is:

1. A method of producing an easy to be swallowed and assimilated vegetable salad comprising the steps of:
   a. masticating approximately equal parts by weight of at least three organically grown raw vegetables in the absence of applied, enzyme-destructive heat or isolated chemicals;
   b. freeze drying said specific vegetables forming powders; and
   c. combining said powders to create an easily swallowed, digested, and assimilated salad.

2. The method of claim 1 wherein said vegetables consist of alfalfa, carrot and lettuce.

3. The method of claim 1 wherein said vegetables consist of carrot, celery and lettuce.

4. The method of claim 1 wherein said vegetables consist of beet, carrot and cucumbers.

5. The method of claim 1 wherein said vegetables consists of brussel sprouts, carrot, lettuce and string bean.

6. A method of producing an easy to be swallowed, digested and assimilated fruit salad consisting of masticating approximately equal parts by weight of raw fresh fruits in the absence of applied, enzyme-destructive heat or isolated chemicals, freeze drying the masticated fruits creating powders, and combining said powders to create a mixture ready to be swallowed, digested and assimilated.

7. The method of claim 6 wherein said fruits consist of banana, date and grape.

8. The method of claim 6 wherein said fruits consist of cantaloupe, honey dew and watermelon.

9. The method of claim 6 wherein said fruits consist of grapefruit, lemon and orange.

10. The method of claim 6 including the step of adding water to said salad to facilitate the swallowing, digesting and assimilating of said salad.

11. The method of claim 6 including the step of adding said salad to a prepared heat-altered food for non-acidic nutritional value when swallowed, digested and assimilated.

* * * * *